United States Patent
Yamauchi et al.

(10) Patent No.: US 10,525,534 B2
(45) Date of Patent: Jan. 7, 2020

(54) LOADING MECHANISM AND MACHINE TOOL SYSTEM

(71) Applicant: NTN CORPORATION, Osaka (JP)

(72) Inventors: Shouhei Yamauchi, Shizuoka (JP); Nobuhiko Tsuji, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/772,127

(22) PCT Filed: Oct. 27, 2016

(86) PCT No.: PCT/JP2016/081912
§ 371 (c)(1),
(2) Date: Apr. 30, 2018

(87) PCT Pub. No.: WO2017/086119
PCT Pub. Date: May 26, 2017

(65) Prior Publication Data
US 2018/0281083 A1    Oct. 4, 2018

(30) Foreign Application Priority Data
Nov. 17, 2015  (JP) .................. 2015-224836

(51) Int. Cl.
B23B 31/36   (2006.01)
B23Q 7/04    (2006.01)
(Continued)

(52) U.S. Cl.
CPC .......... *B23B 31/36* (2013.01); *B23Q 7/002* (2013.01); *B23Q 7/04* (2013.01); *B23Q 17/003* (2013.01);
(Continued)

(58) Field of Classification Search
CPC .......... B32B 31/02; B32B 31/36; B23Q 7/04; B23Q 17/00; B23Q 17/002; B23Q 17/003;
(Continued)

(56) References Cited

U.S. PATENT DOCUMENTS 5,299,472 A * 4/1994 Ellis ............... B23D 65/00
                                                 228/5.1
6,579,156 B2 * 6/2003 Sugino ............ B24B 1/00
                                              29/898.066
(Continued)

FOREIGN PATENT DOCUMENTS

JP    7-106404           4/1995
JP    07106404 A  *  4/1995  ............. G03F 7/707
(Continued)

OTHER PUBLICATIONS

Machine Translation, Japan Patent Document, JP 7106404A, Chiba et al., Apr. 21, 1995. (Year: 1995).*
International Search Report dated Dec. 20, 2016 in International (PCT) Application No. PCT/JP2016/081912.
International Preliminary Report on Patentability and Written Opinion of the International Searching Authority dated May 22, 2018 in International (PCT) Application No. PCT/JP2016/081912.
(Continued)

*Primary Examiner* — Eric A. Gates
*Assistant Examiner* — Chwen-Wei Su
(74) *Attorney, Agent, or Firm* — Wenderoth, Lind & Ponack, L.L.P.

(57) ABSTRACT

A workpiece is conveyed from a first fixed point to a second fixed point by a conveyor in a chucked state. A phase of the workpiece that is being conveyed by the conveyor is detected by a detector. The workpiece conveyed to the second fixed point by the conveyor is seated on a seating part. A workpiece seating phase of the seating part is adjusted by an adjustor to the phase of the workpiece detected by the detector.

18 Claims, 11 Drawing Sheets

(51) Int. Cl.
   *B23Q 17/20* (2006.01)
   *B23Q 17/00* (2006.01)
   *B23Q 7/00* (2006.01)
   *B23Q 17/22* (2006.01)

(52) U.S. Cl.
   CPC ........... *B23Q 17/006* (2013.01); *B23Q 17/20* (2013.01); *B23Q 17/002* (2013.01); *B23Q 17/2241* (2013.01); *Y10T 279/13* (2015.01); *Y10T 279/21* (2015.01)

(58) Field of Classification Search
   CPC .... B23Q 17/005; B23Q 17/006; B23Q 17/20; B23Q 16/02; B23Q 16/10; Y10T 279/21; Y10T 279/13
   See application file for complete search history.

(56) References Cited

U.S. PATENT DOCUMENTS

| | | | |
|---|---|---|---|
| 8,827,608 B2* | 9/2014 | Fujimura | B23Q 17/005 279/4.02 |
| 10,232,482 B2* | 3/2019 | Suzuki | B23Q 17/006 |

FOREIGN PATENT DOCUMENTS

| | | |
|---|---|---|
| JP | 2003-080435 | 3/2003 |
| JP | 2009-050948 | 3/2009 |

OTHER PUBLICATIONS

Office Action dated Aug. 2, 2019 in corresponding Chinese Patent Application No. 201680066593.9, with English translation of Search Report.

* cited by examiner

LOADING MECHANISM AND MACHINE TOOL SYSTEM

TECHNICAL FIELD

The present invention relates to a loading mechanism and a machine tool system.

BACKGROUND ART

There have hitherto been machining systems such as a machine tool system (Patent Literature 1) and a composite component machining system (Patent Literature 2). The machine tool system described in Patent Literature 1 includes a machine tool and a loader. The machine tool is configured to process a workpiece that is held and rotated by a spindle chuck with a tool. The loader is configured to convey (carry) the workpiece to the spindle chuck of the machine tool. Further, the composite component machining system described in Patent Literature 2 is configured to process a composite component (for example, a wheel bearing device) formed of two components that are coupled to each other with a bearing so as to be rotatable.

In Patent Literature 1 and the like, there is provided a seating confirming mechanism configured to confirm whether or not the workpiece is suitably seated on a spindle chuck portion when the workpiece is carried by the loader. As the seating confirming mechanism, there is given an air type seating confirming mechanism configured to determine whether or not the workpiece is seated by detecting, with a sensor, a differential pressure of air in a supply path, which is generated when an air nozzle provided to a workpiece seating surface of the spindle chuck is closed.

CITATION LIST

Patent Literature 1: JP 2009-50948 A
Patent Literature 2: JP 2003-80435 A

SUMMARY OF INVENTION

Technical Problem

Figure 12A:
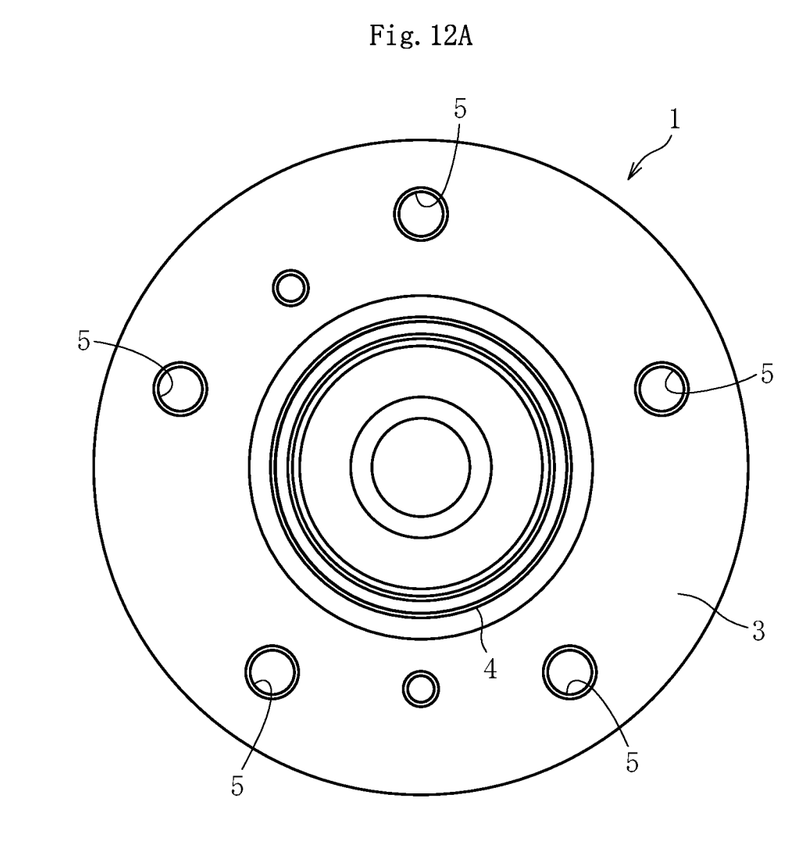
FIG. 12A is a front view of a hub wheel including a disc-shaped flange.
Figure 12B:
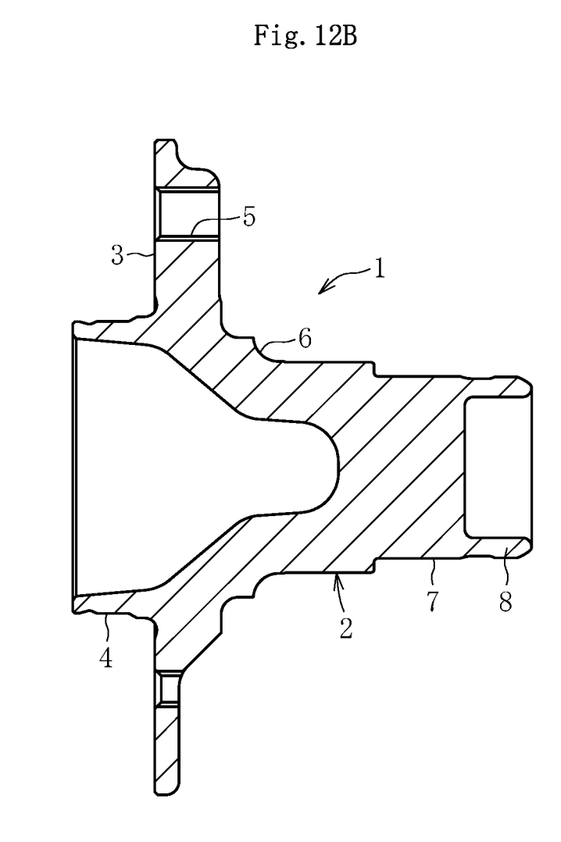
FIG. 12B is a sectional view of the hub wheel including the disc-shaped flange.

There is a case in which the workpiece is a hub wheel of a wheel bearing device as illustrated in FIG. 12A and FIG. 12B. A hub wheel 1 in this case includes a solid shaft portion 2, amounting flange (wheel mounting flange) 3 extending from the shaft portion 2 in a radially outward direction, and a positioning tubular portion (pilot potion) 4 arranged on an opposite side in an axial direction from the shaft portion 2 with respect to the flange 3. Mounting holes 5 for receiving hub bolts (not shown) mounted thereto are formed in the flange 3, and a raceway surface 6 is formed on the shaft portion 2 in the vicinity of the flange 3.

Further, an inner ring (not shown) (raceway surface is formed on a radially inner surface of the inner ring) is mounted to the hub wheel 1. Therefore, a small-diameter step portion 7 is formed on the shaft portion 2 on a side opposite to the flange, and the inner ring is fitted (externally fitted) to the small-diameter step portion 7. Therefore, a tubular portion 8 is formed at an end of the shaft portion 2 on the side opposite to the flange. That is, caulking for increasing a diameter of the tubular portion 8 in the radially outward direction is performed under a state in which the inner ring is mounted to the small-diameter step portion 7, to thereby form a caulking portion. Through use of the caulking portion, the inner ring is fixed to the small-diameter step portion 7.

Figure 14A:
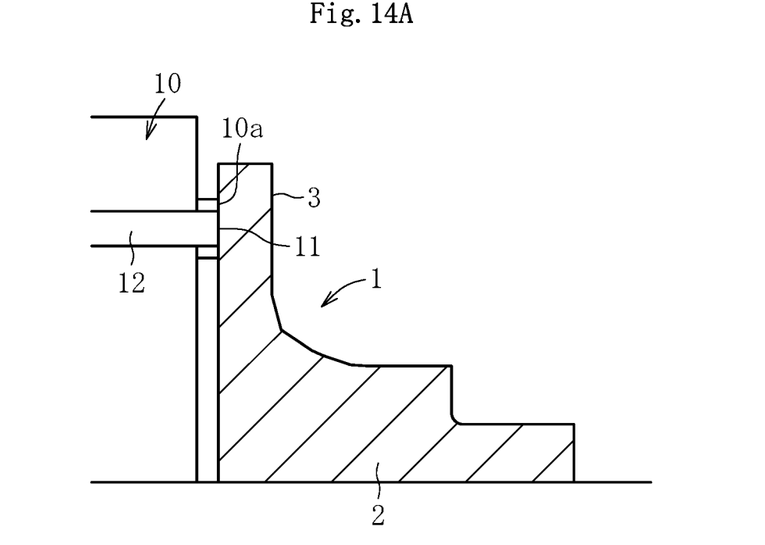
FIG. 14A is an illustration of a relationship between the hub wheel and the seating surface, and is a schematic view for illustrating a state in which the hub wheel is normally seated.
Figure 14B:
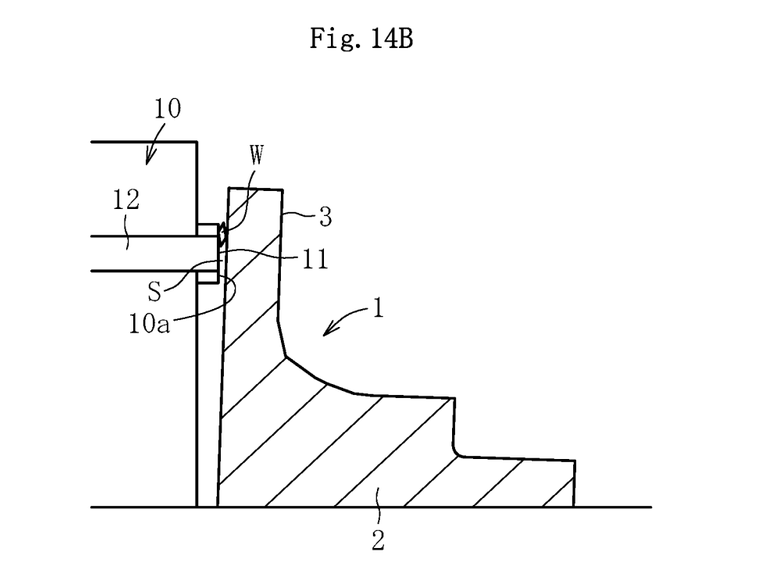
FIG. 14B is an illustration of a relationship between the hub wheel and the seating surface, and is a schematic view for illustrating a state in which the hub wheel is not normally seated.

When the raceway surface 6 of the hub wheel 1 as described above is to be subjected to grinding through use of the machine tool system described in Patent Literature 1 and the like, seating confirmation is performed by the above-mentioned seating confirming mechanism. That is, as illustrated in FIG. 14A, and FIG. 14B, air flow passages 12 each having an air discharge port 11 opened in a workpiece seating surface 10a of a spindle chuck 10 are formed. When the hub wheel 1 that is a workpiece is normally seated on the seating surface 10a, the air discharge ports 11 are closed with the flange 3 as illustrated in FIG. 14A. When the hub wheel 1 is not normally seated on the seating surface 10a due to interposition of a foreign matter W, for example, a chip, a gap S is formed between the flange 3 and the air discharge port 11 as illustrated in FIG. 14B.

Therefore, in the seating confirming mechanism, air is supplied from an air supply source (not shown) to the air flow passages 12, and a back pressure in each air flow passage 12 is measured. That is, as illustrated in FIG. 14A, when the air discharge port 11 is closed with the flange 3, air is not discharged from the air discharge port 11, and hence the back pressure increases. Meanwhile, when the gap S is formed between the flange 3 and the air discharge port 11 as illustrated in FIG. 14B, air is discharged from the air discharge port 11, and hence the back pressure decreases. Therefore, it is understood that the workpiece (hub wheel 1) is normally seated when the back pressure is high, and that the hub wheel 1 is not normally seated when the back pressure is low.

Figure 13:
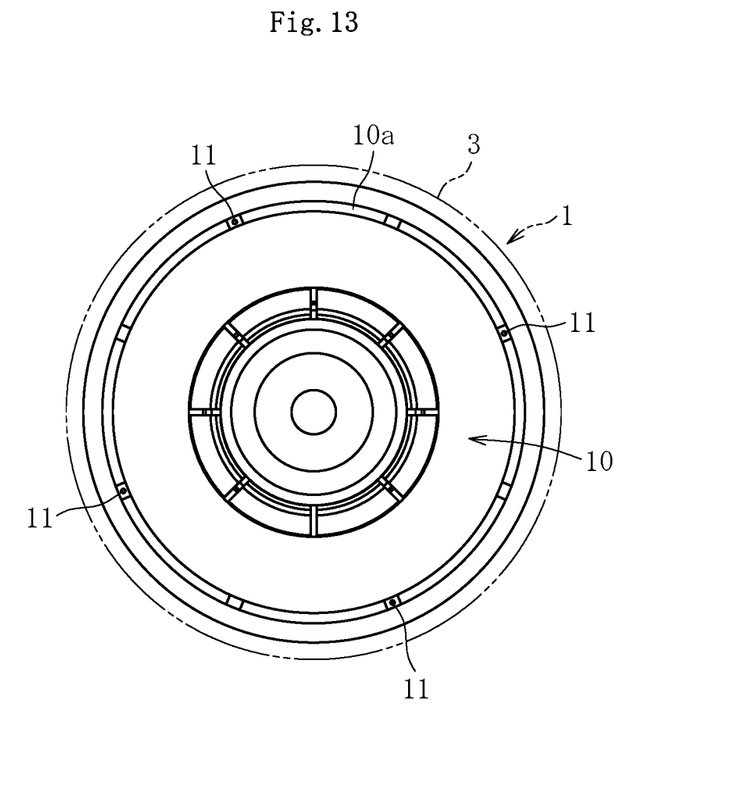
FIG. 13 is a schematic view for illustrating a seating surface of the chuck mechanism for machining.

In the hub wheel 1 illustrated in FIG. 12A and FIG. 12B, the flange 3 has a disc shape. Therefore, in any phase of the hub wheel 1, as illustrated in FIG. 13, the air discharge ports 11 of the air flow passage 12 correspond to the flange 3, and hence it is not required to adjust the phase of the hub wheel 1.

Figure 15:
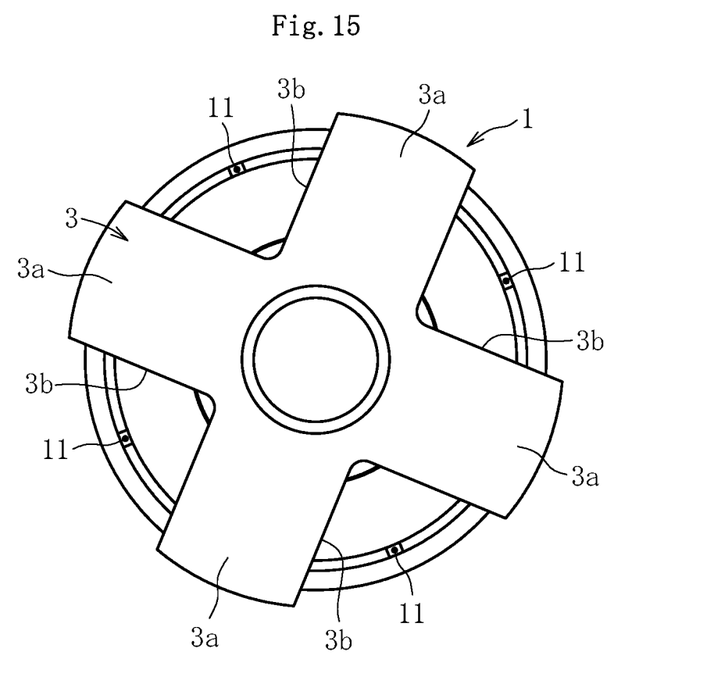
FIG. 15 is a schematic view of a state in which flange division piece portions of the hub wheel do not correspond to air discharge ports.

However, there is a case in which, in the flange 3 of the hub wheel 1 of the above-mentioned type, cutout portions 3b are formed at a predetermined pitch (90° pitch) along a circumferential direction as illustrated in FIG. 15. In this case, as illustrated in FIG. 15, flange division pieces 3a may not correspond to the air discharge ports 11.

When the flange division pieces 3a do not correspond to the air discharge ports 11 as described above, the seating confirming mechanism having the configuration described above is not adaptable. That is, in the case in which the flange division pieces 3a do not correspond to the air discharge ports 11 even when the hub wheel 1 is properly (normally) seated, the back pressure in the air flow passage 12 is small, with the result that it is determined that the hub wheel 1 is not normally seated.

Figure 16:
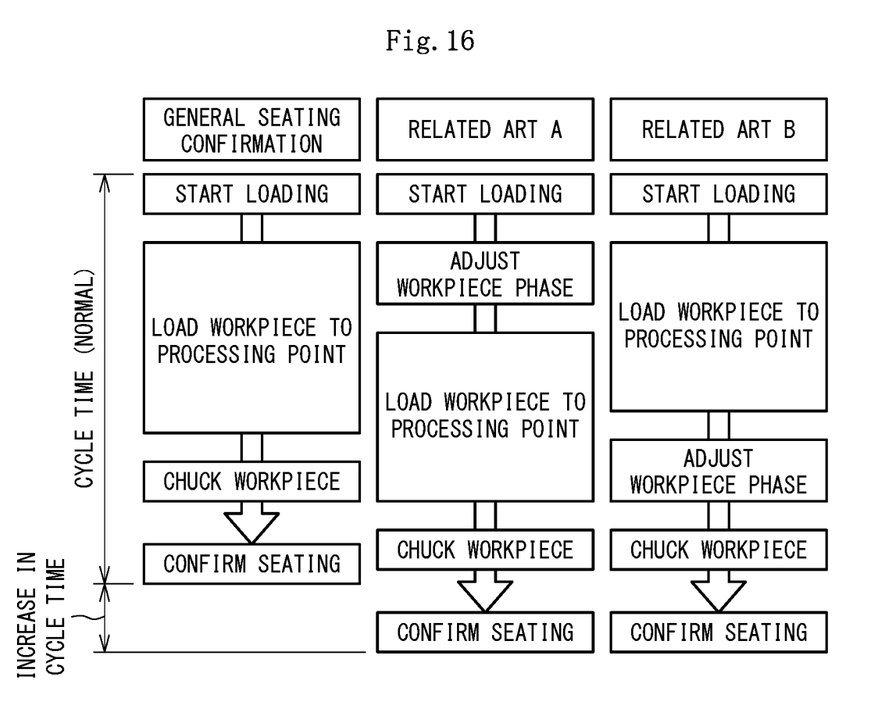
FIG. 16 is a block diagram for illustrating a cycle time in related-art steps in a case in which general seating confirmation is performed, a case in which workpiece phase adjustment is performed before workpiece loading (related art A), and a case in which the workpiece phase adjustment is performed after the workpiece loading (related art B).

That is, as illustrated in FIG. 16, general seating confirmation (in the case of having the disc-shaped flange 3) involves starting loading, loading the workpiece to a processing point, chucking the workpiece at the processing point, and thereafter performing seating confirmation.

Meanwhile, when the workpiece is the hub wheel 1 having the cutout portions 3b formed at a predetermined pitch along the circumferential direction, for example, steps described in a related art A and a related art B of FIG. 16 are performed. That is, in the case of the related art A of FIG. 16, after loading is started, a phase of the hub wheel 1 (workpiece phase) is first adjusted to a workpiece seating phase of a chuck, and the workpiece is loaded to a processing point.

After that, the workpiece is chucked at the processing point, and seating confirmation is performed.

In the case of the related art B of FIG. 16, after loading is started, the workpiece is first loaded to a processing point. After that, a workpiece phase is adjusted to a workpiece seating phase of a chuck. Then, the workpiece is chucked, and seating confirmation is performed. Therefore, in the related art A and the related art B of FIG. 16, when workpiece phase adjustment is performed, a cycle time becomes longer than that of the general seating confirmation steps of FIG. 16.

In view of the foregoing, the present invention provides a loading mechanism and a machine tool system, which are capable of stably performing seating confirmation with respect to a workpiece including a flange having cutout portions formed at a predetermined pitch along a circumferential direction and avoiding an increase in cycle time.

Solution to Problem

According to one embodiment of the present invention, there is provided a loading mechanism, comprising: a conveyor configured to convey a workpiece from a first fixed point to a second fixed point in a chucked state; a detector configured to detect a phase of the workpiece that is being conveyed by the conveyor; a seating part configured to receive the workpiece, which is conveyed to the second fixed point by the conveyor, to be seated thereon; and an adjustor configured to adjust a workpiece seating phase of the seating part to the phase of the workpiece detected by the detector during conveyance of the workpiece from the first fixed point to the second fixed point by the conveyor.

In the loading mechanism according to one embodiment of the present invention, the workpiece seating phase of the seating part can be adjusted to the phase of the workpiece during conveyance of the workpiece from the first fixed point to the second fixed point. Therefore, when the workpiece reaches the second fixed point, the phase of the workpiece is matched with the workpiece seating phase of the seating part.

It is preferred that the detector comprise: a workpiece passage confirming sensor including a pattern reading sensor configured to read an ON-OFF pattern, the workpiece passage confirming sensor being turned on in a workpiece detection state in which the workpiece is detected and being turned off in a workpiece non-detection state in which the workpiece is not detected; and a calculator configured to calculate the phase of the workpiece based on the ON-OFF pattern read by the workpiece passage confirming sensor.

The detector can stably detect the phase of the workpiece as long as the detector comprises the workpiece passage confirming sensor and the calculator.

It is preferred that the workpiece comprise a flange having cutout portions formed at a predetermined pitch along a circumferential direction, and that the workpiece passage confirming sensor be configured to detect passage of a flange division piece portion between the cutout portions of the flange. With this, the phase of the flange division piece portions can be confirmed.

The conveyor may comprise: an arm that is turned about a rotary shaft; and a chuck mechanism for conveyance, which is arranged at a distal end of the arm, and is configured to chuck the workpiece. With the above-mentioned configuration, when the rotary shaft is turned, the arm is rocked, thereby being capable of moving the chuck mechanism for conveyance arranged at the distal end of the arm between the first fixed point and the second fixed point. Therefore, the workpiece chucked by the chuck mechanism for conveyance can be moved between the first fixed point and the second fixed point.

According to one embodiment of the present invention, there is provided a machine tool system, comprising the loading mechanism. The seating part comprises: a chuck mechanism for machining configured to chuck and support the workpiece conveyed to the second fixed point by the conveyor; and a seating confirming part configured to define the chuck support state by the chuck mechanism for machining as a state in which the workpiece is seated and confirm whether or not the workpiece is appropriately seated.

With the machine tool system according to one embodiment of the present invention, when the workpiece is conveyed from the first fixed point to the second fixed point, the phase of the workpiece can be matched with the seating phase in the seating state that is the chuck support state by the chuck mechanism for machining. Seating confirmation by the seating confirming part can be stably performed.

It is preferred that the seating confirming part comprise: an air supply mechanism including an air supply passage for discharging air from an air discharge port to the workpiece; and an air pressure detection sensor configured to detect an air pressure (back pressure) in the air supply passage of the air supply mechanism. With the machine tool system comprising the seating confirming part, it is understood that the workpiece is normally seated when the back pressure is high, and that the workpiece is not normally seated when the back pressure is low. Further, the phase of the workpiece can be matched with the seating phase in the seating state. Therefore, even when the workpiece includes the flange having the cutout portions formed at the predetermined pitch along the circumferential direction, the flange division piece portions are allowed to correspond to the air discharge ports of the air supply mechanism, and false recognition by the seating confirming part can be avoided.

Advantageous Effects of Invention

In the loading mechanism of the present invention, when the workpiece reaches the second fixed point, the phase of the workpiece is matched with the workpiece seating phase of the seating part. Therefore, it is not required to provide the step of adjusting the workpiece phase in addition to workpiece loading with respect to a workpiece in which the phase of the workpiece is required to be adjusted to the seating phase, and hence the cycle time as a whole can be set equal to the cycle time given in the case in which the workpiece phase adjustment is not required.

In the machine tool system of the present invention, the phase of the workpiece can be matched with the seating phase in the seating state that is the chuck support state by the chuck mechanism for machining, and hence seating confirmation by the seating confirming part can be stably performed. In particular, even with the workpiece including the flange having the cutout portions formed at the predetermined pitch along the circumferential direction, when the seating confirming part including the air pressure detection sensor configured to detect the air pressure (back pressure) in the air supply passage is used, the air discharge ports are allowed to correspond to the flange division piece portions, and hence false recognition of seating confirmation can be avoided, thereby being capable of performing highly reliable seating confirmation.

DESCRIPTION OF EMBODIMENTS

Now, an embodiment of the present invention is described with reference to FIG. 1 to FIG. 11. FIG. 4A and FIG. 4B are views for illustrating a hub wheel of a wheel bearing device. A hub wheel 21 comprises a solid shaft portion 22, a mounting flange (wheel mounting flange) 23 extending from the shaft portion 22 in a radially outward direction, and a positioning tubular portion (pilot potion) 24 arranged on an opposite side in an axial direction from the shaft portion 22 with respect to the flange 23. Mounting holes 25 for receiving hub bolts (not shown) mounted thereto are formed in the flange 23, and a raceway surface 26 is formed on the shaft portion 22 in the vicinity of the flange 23.

Further, an inner ring (not shown) (raceway surface is formed on a radially inner surface of the inner ring) is mounted to the hub wheel 21. Therefore, a small-diameter step portion 27 is formed on the shaft portion 22 on a side opposite to the flange, and the inner ring is fitted (externally fitted) to the small-diameter step portion 27. Therefore, a tubular portion 28 is formed at an end of the shaft portion 22 on the side opposite to the flange. That is, caulking for increasing a diameter of the tubular portion 28 in the radially outward direction is performed under a state in which the inner ring is mounted to the small-diameter step portion 27, to thereby form a caulking portion. Through use of the caulking portion, the inner ring is fixed to the small-diameter step portion 27. The wheel bearing device comprises the hub wheel 21, the inner ring (not shown), an outer ring, and a plurality of balls (rolling elements) arranged in a double row.

In this case, as illustrated in FIG. 4A, the flange 23 has a plurality of (four) cutout portions 23b formed at a predetermined pitch (90° pitch) along a circumferential direction, and a plurality of (four) flange division piece portions 23a are arranged at a predetermined pitch (90° pitch) along the circumferential direction. Therefore, each of the flange division piece portions 23a has the mounting hole 25.

Figure 1:
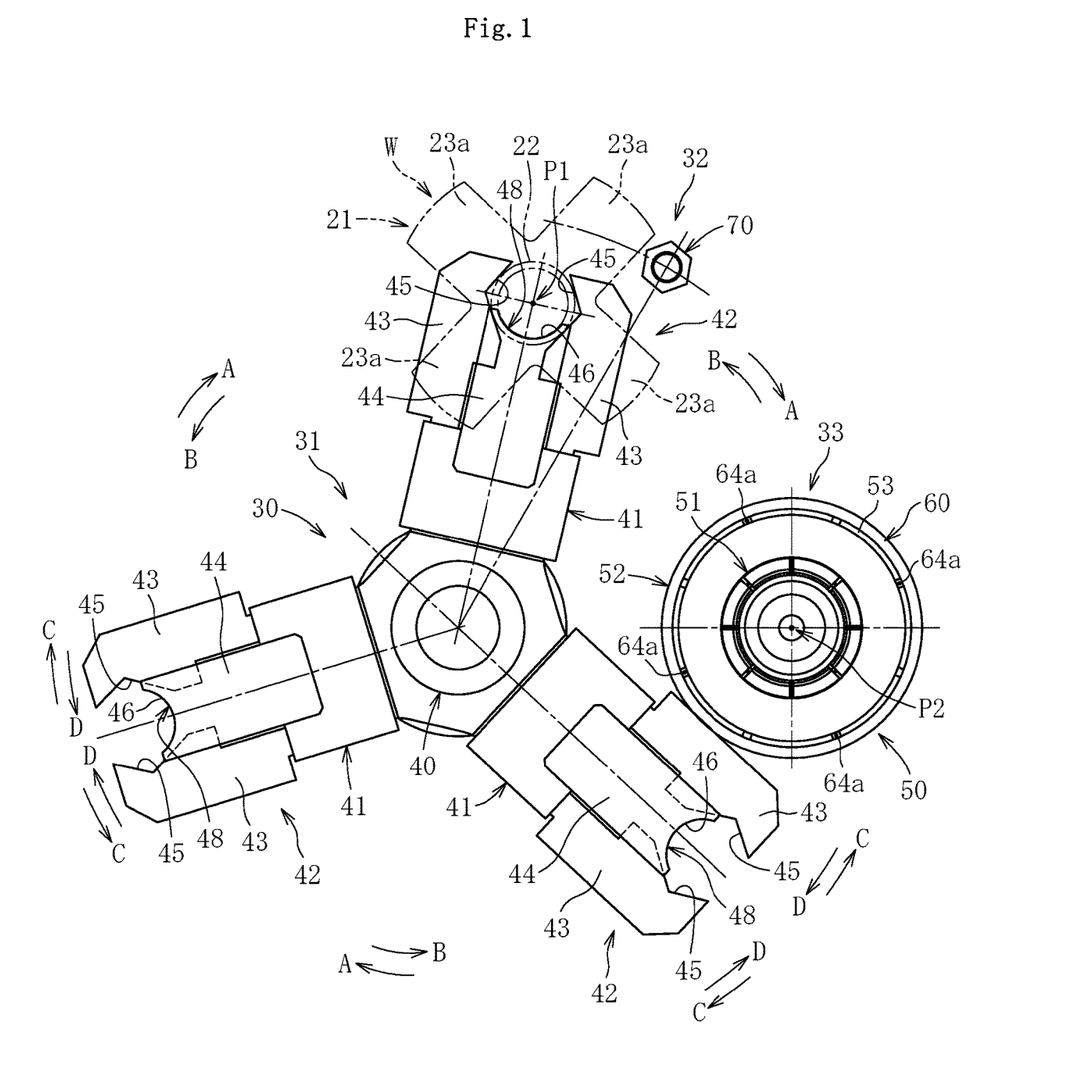
FIG. 1 is a schematic view of a machine tool system using a loading mechanism of the present invention.

FIG. 1 is a view for illustrating a machine tool system according to the present invention using a loading mechanism 30 according to the present invention. The machine tool system is configured to subject the raceway surface 26 of the hub wheel 21 illustrated in FIG. 4A and FIG. 4B being a workpiece W to grinding.

As illustrated in FIG. 1, the loading mechanism 30 comprises a conveyor 31, a detector 32, a seating part 33, and an adjustor 34. The conveyor 31 is configured to convey the workpiece W (that is, the hub wheel 21) from a first fixed point P1 to a second fixed point P2 in a chucked state. The detector 32 is configured to detect a phase of the hub wheel 21 that is being conveyed by the conveyor 31. The seating part 33 is configured to receive the hub wheel 21, which is conveyed to the second fixed point P2 by the conveyor 31, to be seated thereon. The adjustor 34 (see FIG. 2) is configured to adjust a seating phase of the hub wheel 21 of the seating part 33 to the phase of the workpiece detected by the detector 32. In this case, a calculator 35 (see FIG. 2) configured to calculate an adjustment amount of the phase is required.

As illustrated in FIG. 1, the conveyor 31 comprises a rotary shaft 40, three arms 41 extending from the rotary shaft 40 in a radially outward direction, and a chuck mechanism 42 arranged at a distal end of each of the arms 41. The rotary shaft 40 is driven to rotate by a drive source (for example, a rotary actuator or a servo motor) (not shown), and with this, the arms 41 are turned (rocked) in directions of the arrows A and B directions about an axial center of the rotary shaft 40.

Further, the chuck mechanism 42 comprises a pair of rocking claw members 43 and 43 and a support member 44. The pair of rocking claw members 43 and 43 are rocked respectively in directions of the arrows C and D about a proximal end side. The support member 44 is configured to support the hub wheel 21. Recessed portions 45 and 45 which support the shaft portion 22 of the hub wheel 21 to be fitted thereto are formed on a distal end side of inner surfaces of the rocking claw members 43 and 43, and a recessed portion 46 which supports the shaft portion 22 of the hub wheel 21 to be fitted thereto is formed on a distal end surface of the support member 44.

In this case, the pair of rocking claw members 43 and 43 are rocked through a reciprocation mechanism (not shown) such as a cylinder mechanism, a ball nut mechanism, or a linear guide mechanism, and a transmission mechanism (crank mechanism or the like) (not shown) configured to transmit a drive force of the reciprocation mechanism to the rocking claw members 43.

Therefore, the pair of rocking claw members 43 and 43 can be displaced between a closed state in which the pair of rocking claw members 43 and 43 are rocked as indicated by the arrows D and D to be arranged in parallel and an opened state in which the pair of rocking claw members 43 and 43 are rocked as indicated by the arrows C and C about the proximal end side. In the closed state of the rocking claw members 43 and 43, a fitting portion 48 which supports the shaft portion 22 of the hub wheel 21 to be fitted thereto is formed by the recessed portions 45 and 45 of the rocking claw members 43 and 43 and the recessed portion 46 of the support member 44, and the hub wheel 21 is chucked. Further, when the rocking claw members 43 and 43 are brought into the opened state from the chucked state, a chuck canceling state is obtained.

In this embodiment, the seating part 33 is formed of a chuck mechanism 50 for machining. In this case, the chuck mechanism 50 for machining is a collet chuck mechanism and comprises an expansion/contraction structure configured to allow an expandable and contractible collet 51 to expand or contract, and a receiving tubular body 52 configured to receive the collet 51, the expansion/contraction structure, and the like.

That is, when the pilot portion 24 (see FIG. 4A and FIG. 4B) is fitted to the collet 51, and the collet 51 is reduced in diameter in this state, the pilot portion 24 of the hub wheel 21 is chucked by the collet chuck mechanism. In this case, the flange 23 of the hub wheel 21 is brought into abutment against an end surface of the receiving tubular body 52, that is, the seating surface 53. The state in which the hub wheel 21 is chucked (fixed) by the collet 51 to be brought into abutment against the seating surface 53 as described above corresponds to a seating state.

Figure 5:
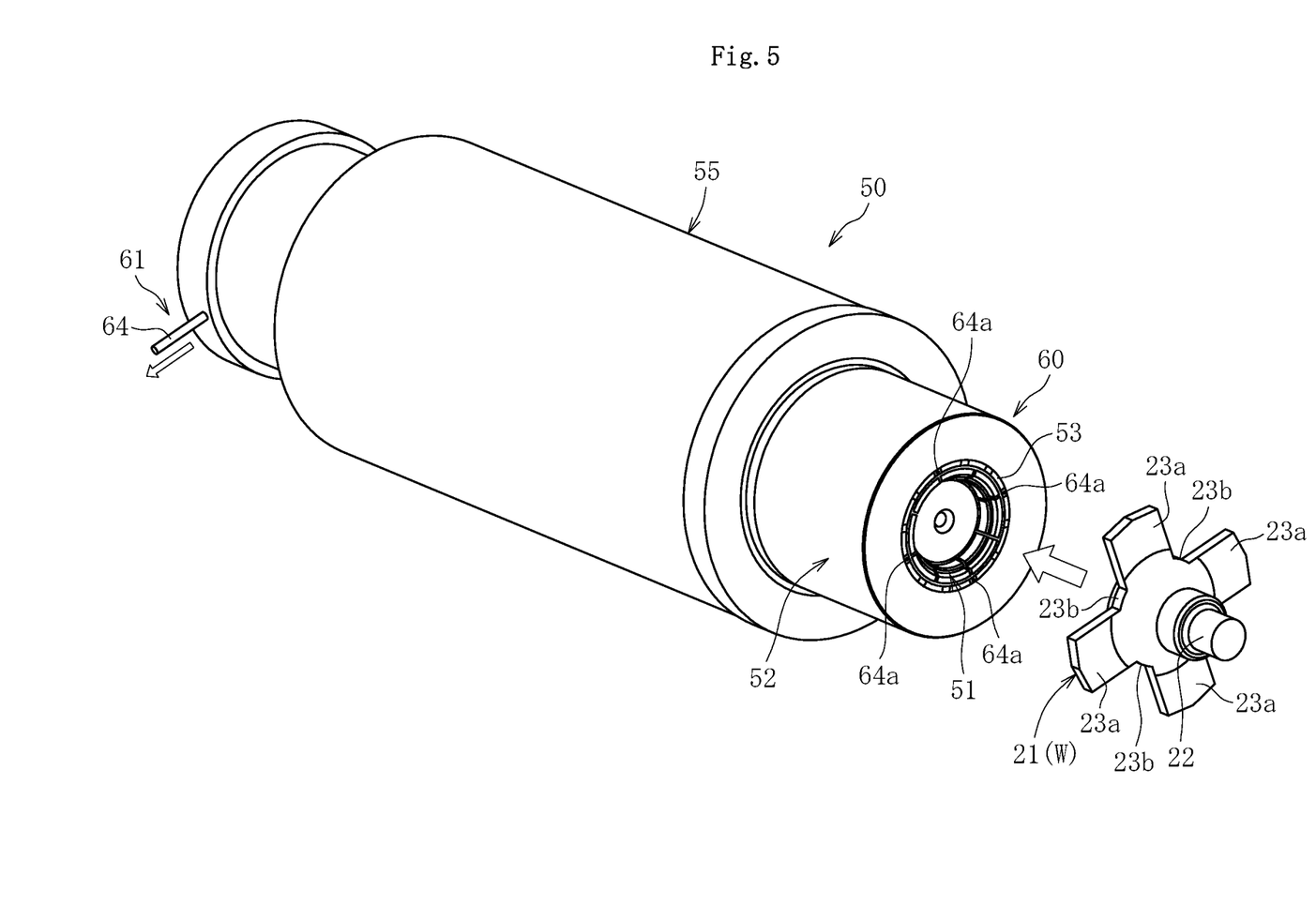
FIG. 5 is a perspective view of a chuck mechanism for machining.

Further, the receiving tubular body 52 is received in a spindle 55 (see FIG. 5). The spindle 55 can be rotated about an axial center thereof, and can also reciprocate along the axial center. Therefore, the receiving tubular body 52 can also be rotated about the axial center in a similar manner. Both rotation about the axial center and reciprocation along the axial center of the spindle 55 can be performed with a well-known drive mechanism. The rotation drive mechanism for rotation about the axial center and the reciprocation mechanism for reciprocation along the axial center direction of the spindle 55 can form the adjustor 34 (see FIG. 2).

The chuck mechanism 50 comprises a seating confirming part 60. As illustrated in a configuration view of FIG. 3, the seating confirming part 60 comprises an air supply mechanism 61, an air pressure detector 62, and a determining part 63 configured to determine whether or not seating is normal.

Figure 7:
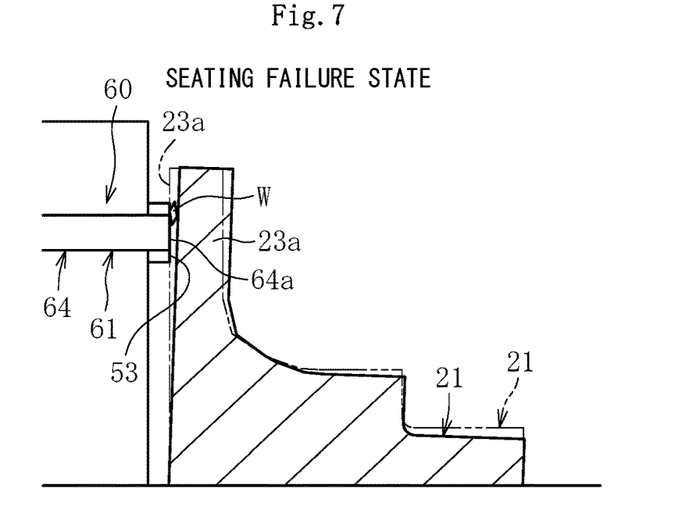
FIG. 7 is a schematic sectional view of the workpiece in a seating failure state and the chuck mechanism for machining.
Figure 8:
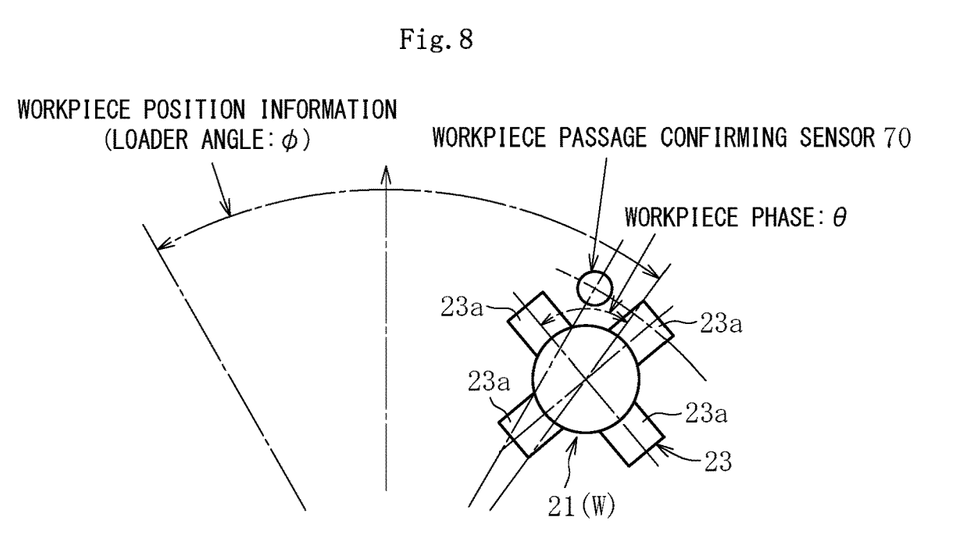
FIG. 8 is a schematic view for illustrating a relationship among workpiece position information, a workpiece passage confirming sensor, and the workpiece phase.

As illustrated in FIG. 7, the air supply mechanism 61 comprises air supply passages 64 formed in the spindle 55, and air discharge ports 64a of the air supply passages 64 are opened to the seating surface 53. As illustrated in FIG. 1, the air discharge ports 64a are formed at a predetermined pitch (90° pitch) along the circumferential direction. A compressor serving as an air supply source (not shown) is connected to the air supply passages 64.

Figure 3:
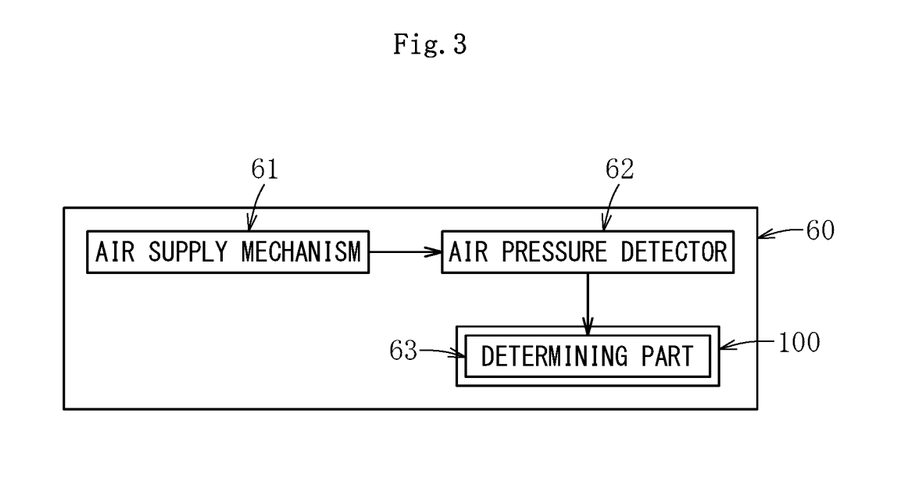
FIG. 3 is a block diagram for illustrating a control portion of a seating confirming part in the present invention.
Figure 4A:
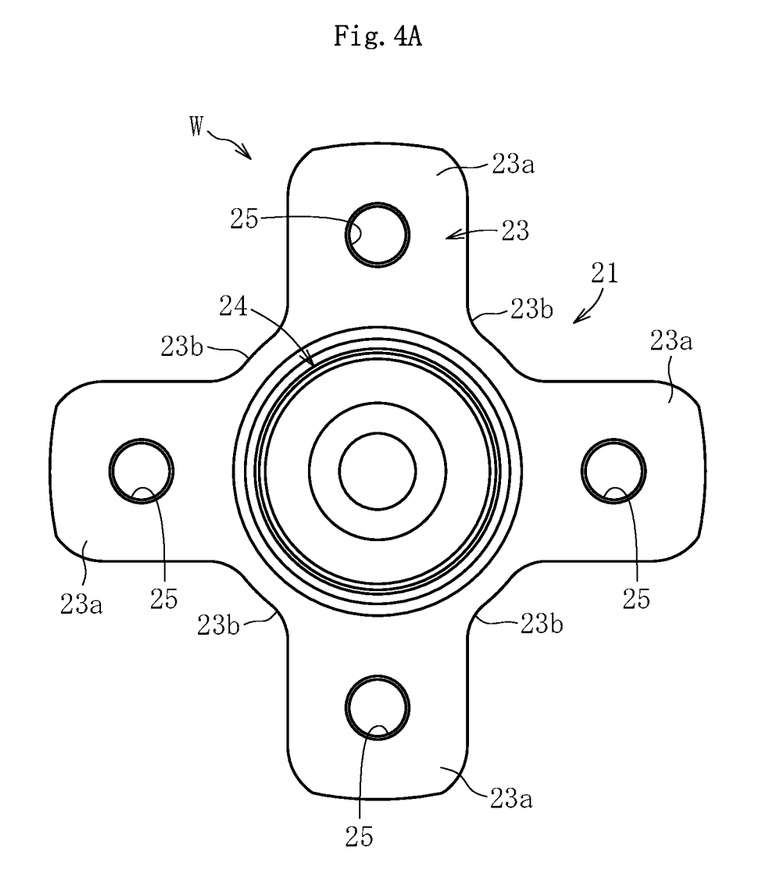
FIG. 4A is a front view of a hub wheel to be processed by the machine tool system.
Figure 4B:
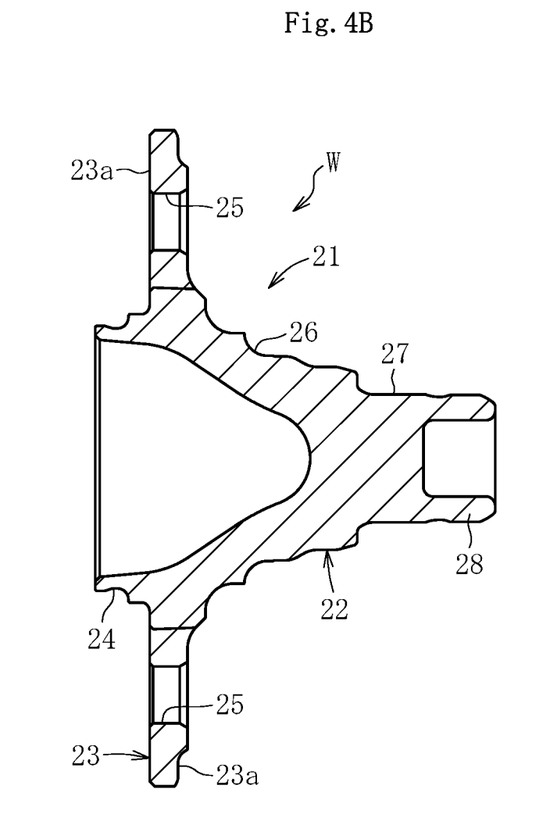
FIG. 4B is a sectional view of the hub wheel to be processed by the machine tool system.

The air pressure detector 62 illustrated in FIG. 3 is formed of a pressure sensor configured to measure an air pressure (back pressure) in the air supply passage 64, and a measured value of an air pressure (back pressure) in the air supply passage detected by the pressure sensor is sent to the determining part 63.

Figure 6A:
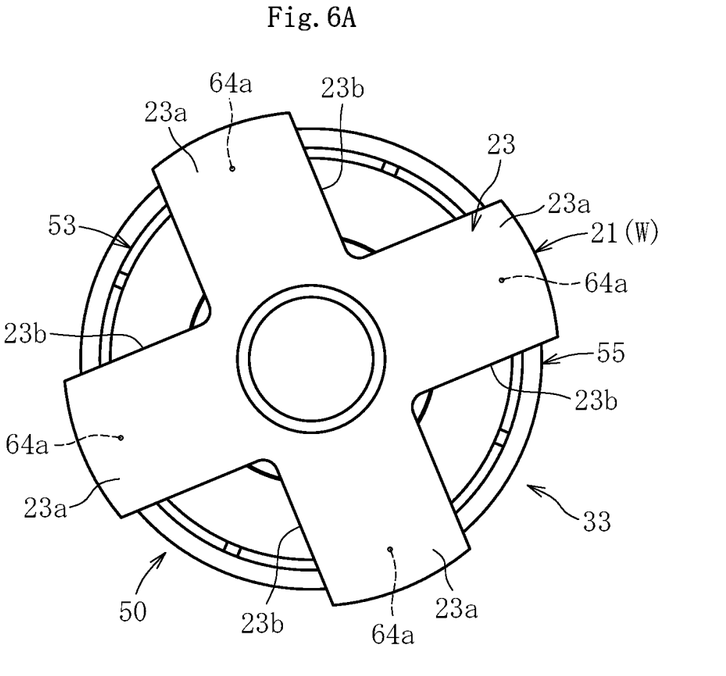
FIG. 6A is an illustration of a workpiece seating state of the chuck mechanism for machining, and is a schematic view for illustrating a state in which a workpiece phase is matched with a seating phase.

That is, when air is supplied into the air supply passage 64 under a state in which the flange division piece portions 23a of the hub wheel 21 correspond to the air discharge ports 64a as illustrated in FIG. 6A, and the flange division piece portions 23a are held in close contact with the seating surface 53 as indicated by the imaginary line of FIG. 7, the air discharge ports 64a are closed with the flange division piece portions 23a, and hence a measured value of an air pressure (back pressure) in the air supply passage is large.

Meanwhile, when the foreign matter W, for example, a chip is interposed between the seating surface 53 and the flange division piece portion 23a, the hub wheel 21 is inclined from a normal state as indicated by the solid line of FIG. 7. In this case, the air discharge port 64 is opened, and hence a measured value of an air pressure (back pressure) in the air supply passage is small.

The determining part 63 determines that the workpiece (hub wheel 21) is appropriately seated when an air pressure (back pressure) is large, and that the workpiece (hub wheel 21) is not appropriately seated when an air pressure (back pressure) is small. Here, the air pressure (back pressure) which leads to the determination that the workpiece is seated and the air pressure which leads to the determination that the workpiece is not seated can be suitably set.

Figure 6B:
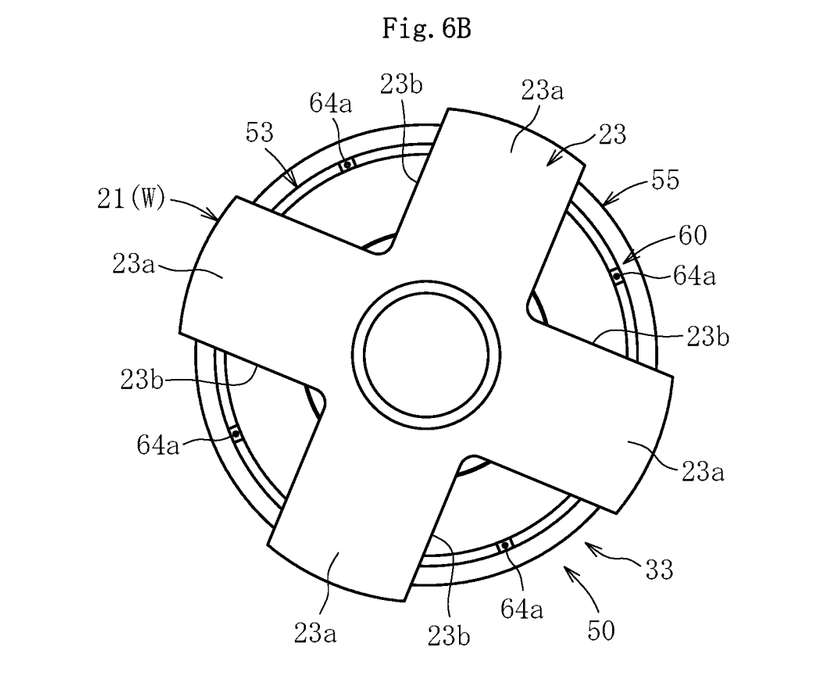
FIG. 6B is an illustration of a workpiece seating state of the chuck mechanism for machining, and is a schematic view for illustrating a state in which the workpiece phase is not matched with the seating phase.

Also in a case in which the flange division piece portions 23a of the hub wheel 21 do not correspond to the air discharge ports 64a as illustrated in FIG. 6B in the seating state in which the flange division piece portions 23a are brought into close contact with the seating surface 53, the air discharge ports 64a are opened, and hence it is determined that the workpiece is not appropriately seated.

Therefore, in the invention of the present application, the detector 32, the adjustor 34, and the like (see FIG. 2) are arranged so that the flange division piece portions 23a correspond to the air discharge ports 64 of the seating confirming part 60 when the workpiece W (hub wheel 21) is conveyed to the second fixed point P2.

Figure 9:
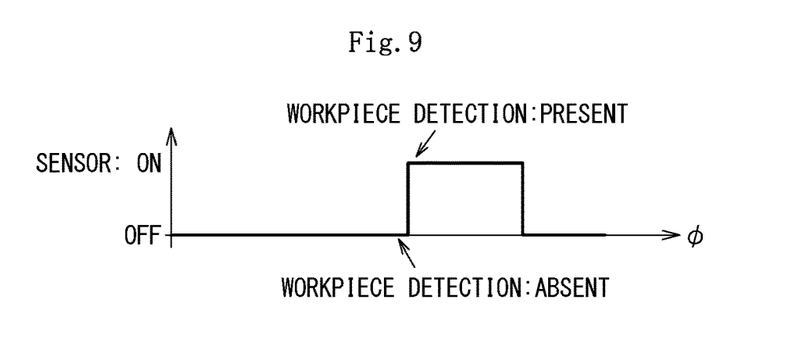
FIG. 9 is a graph for showing an ON-OFF pattern of the workpiece passage confirming sensor.
Figure 10:
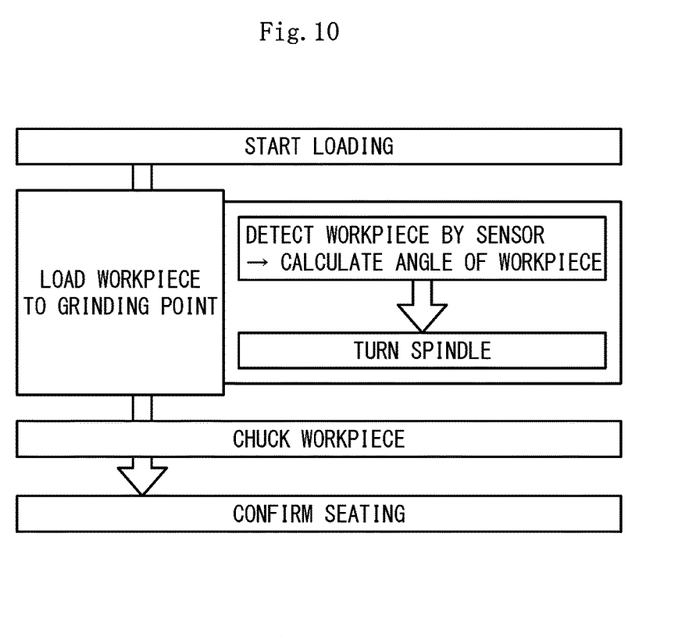
FIG. 10 is a process diagram from start of loading to seating confirmation.

The detector 32 is formed of a workpiece passage confirming sensor 70 (see FIG. 1) including a pattern reading sensor configured to read an ON-OFF pattern. The workpiece passage confirming sensor 70 is turned on in a workpiece detection state in which the workpiece W (hub wheel 21) is detected. The workpiece passage confirming sensor 70 is turned off in a workpiece non-detection state in which the workpiece W is not detected. That is, when the workpiece W (hub wheel 21) is conveyed from the state illustrated in FIG. 1, that is, the state in which the workpiece W (hub wheel 21) is chucked at the first fixed point P1 to the second fixed point P2 by the conveyor 31, one flange division piece portion 23a passes by the workpiece passage confirming sensor 70. When the flange division piece portion 23a passes by the workpiece passage confirming sensor 70 as described above, the sensor 70 is turned on under a state in which the flange division piece portion 23a corresponds to the sensor 70 and is turned off under the other state as shown in FIG. 9.

Figure 2:
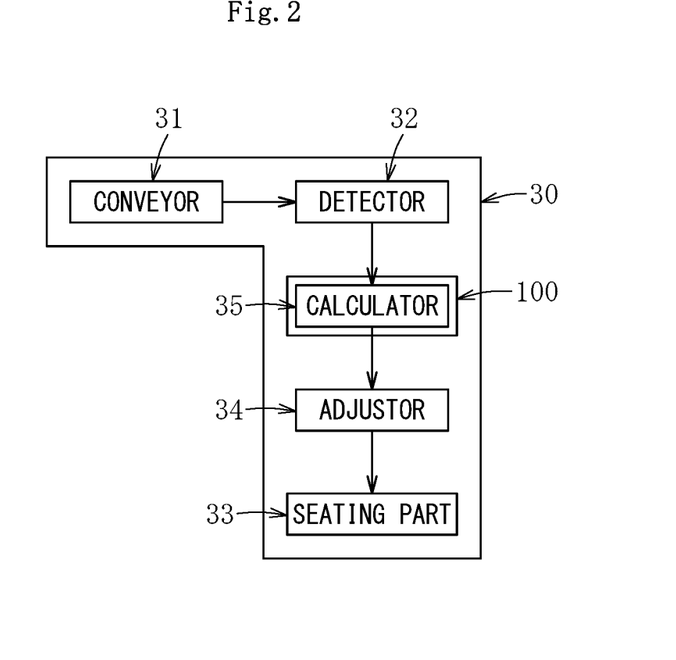
FIG. 2 is a block diagram for illustrating a control portion of the loading mechanism.

In the workpiece passage confirming sensor 70, the ON-OFF pattern is read, and a phase of the workpiece W (hub wheel 21) (workpiece phase) up to the inside of a conveyance passage is detected (calculated) based on the ON-OFF pattern, workpiece position information (rotation angle φ of the rotary shaft) in the conveyance passage, and the shape of the workpiece through use of the calculator 35 as illustrated in FIG. 2. That is, the horizontal axis of FIG. 9 represents the rotation angle φ of the rotary shaft. When the workpiece W (hub wheel 21) is conveyed and passes by the sensor, the rotation angle φ under the ON state in which the flange division piece portion 23a corresponds to the sensor can be recognized, and the workpiece phase during conveyance of the workpiece can be detected based on the rotation angle φ, and the shape of the workpiece, that is, the known size of the flange division piece portion 23a.

In this case, as illustrated in FIG. 6A, under a state in which the flange division piece portions 23a of the workpiece W (hub wheel 21) conveyed to the second fixed point P2 correspond to the air discharge ports 64a of the seating surface, that is, when the phase of the workpiece W (hub wheel 21) (workpiece phase) is matched with the phase of the seating surface 53 of the chuck mechanism 50 for machining, the workpiece is chucked.

However, as illustrated in FIG. 6B, under a state in which the flange division piece portions 23a of the workpiece W (hub wheel 21) conveyed to the second fixed point P2 do not correspond to the air discharge ports 64a of the seating surface 53, that is, when the phase of the workpiece W (hub wheel 21) (workpiece phase) is not matched with the phase of the seating surface 53 of the chuck mechanism 50 for machining, it is required to adjust the phase of the seating surface 53 of the chuck mechanism 50 for machining to the detected workpiece phase. That is, the spindle 55 is rotated so that the flange division piece portions 23a of the workpiece W (hub wheel 21) conveyed to the second fixed point P2 correspond to the air discharge ports 64 of the seating surface 53.

The calculator 35 illustrated in FIG. 2 and the determining part 63 illustrated in FIG. 3 can be formed of a controller 100, for example, a microcomputer in which a read only memory (ROM), a random access memory (RAM), and the like are connected to each other through buses with a central processing unit (CPU) being the center. Further, the controller 100 comprises a storage device serving as a storage part and stores the shape of the workpiece (including the size) in advance. The storage device serving as the storage part encompasses a hard disc drive (HDD), a digital versatile disk (DVD) drive, a compact disc-recordable (CD-R) drive, and an electronically erasable and programmable read only memory (EEPROM). A program to be executed by the CPU and data are stored in the ROM. Further, the calculator 35 illustrated in FIG. 2 and the determining part 63 illustrated in FIG. 3 are formed of one controller 100, but a controller for the calculator and a controller for the determining part may be separately provided.

Therefore, in the machine tool system including the loading mechanism 30 having the configuration described above, as illustrated in FIG. 10, when loading is started, the workpiece can be detected by the sensor 70 and the angle of the workpiece can be calculated during conveyance of the workpiece W from the first fixed point P1 to the second fixed point P2 (during loading of the workpiece to a grinding point). Further, spindle turning of the chuck mechanism 50 (phase adjustment) can be performed. After the phase adjustment, the workpiece can be chucked.

As described above, under a state in which the workpiece W (hub wheel 21) is conveyed to the second fixed point (grinding point) P2, the flange division piece portions 23a of the workpiece W (hub wheel 21) correspond to the air discharge ports 64a of the seating surface as illustrated in FIG. 6A. Therefore, as described above, the seating confirming part 60 can determine whether or not the workpiece W (hub wheel 21) is normally seated, that is, recognize seating.

Figure 11:
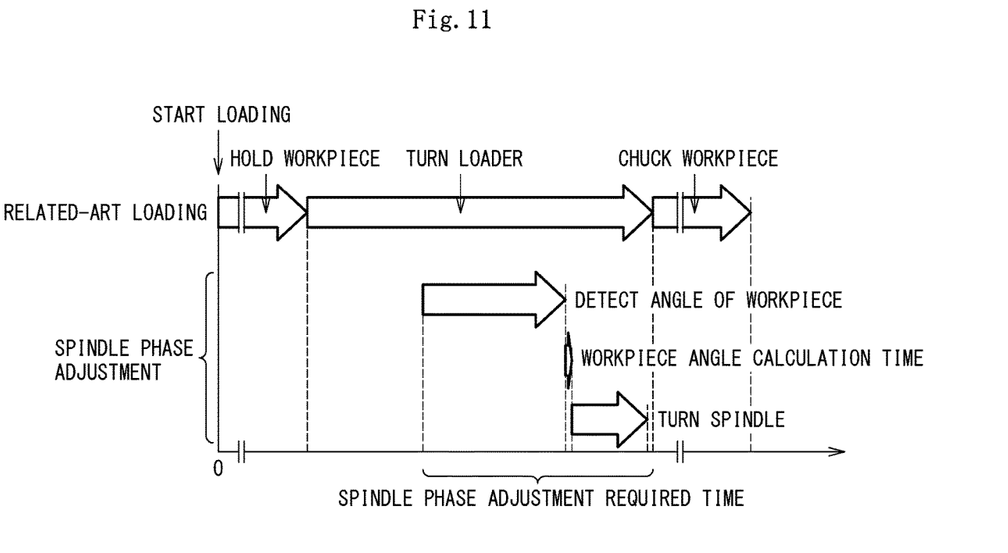
FIG. 11 is a graph for showing an operation time from start of loading to seating confirmation.

FIG. 11 is a graph for showing comparison of an operation time between the related-art machine tool system and the machine tool system of the present invention. For example, in the related-art steps not including phase adjustment, first, a workpiece holding (workpiece chucking) time at the first fixed point P1, a loader turning (conveyance from the first fixed point P1 to the second fixed point P2) time, and a workpiece chucking time at the second fixed point P2 are required.

Meanwhile, in the present invention, workpiece angle detection, workpiece angle calculation, and spindle turning can be performed during loader turning. That is, even when workpiece phase adjustment is performed, the operation time can be shortened to the operation time required in the related art not including phase adjustment.

In the loading mechanism of the present invention, when the workpiece W reaches the second fixed point P2, the phase of the workpiece W is matched with the seating phase of the workpiece W of the seating part 33. Therefore, it is not required to provide the step of adjusting the workpiece phase in addition to workpiece loading with respect to the workpiece W in which the phase of the workpiece W is required to be adjusted to the seating phase. Thus, the cycle time as a whole can be set equal to the cycle time given in the case in which the workpiece phase adjustment is not required.

In the machine tool system of the present invention, the phase of the workpiece W can be matched with the seating phase in the seating state that is the chuck support state by the chuck mechanism for machining, and hence seating confirmation by the seating confirming part 60 can be stably performed. In particular, even with the workpiece W including the flange 23 having the cutout portions 23b formed at the predetermined pitch along the circumferential direction, when the seating confirming part 60 including the air pressure detection sensor configured to detect the air pressure (back pressure) in the air supply passage 64 is used, the air discharge ports 64a are allowed to correspond to the flange division piece portions 23a, and hence false recognition of seating confirmation can be avoided, thereby being capable of performing highly reliable seating confirmation.

The embodiment of the present invention is described above. However, the present invention is not limited to the above-mentioned embodiment, and can be variously modified. In the workpiece W, the number of the flange division piece portions 23a is not limited to four as illustrated in FIG. 4A. Therefore, the number of the air discharge ports 64a of the seating confirming part 60 can also be suitably set in accordance with the number of the flange division piece portions 23a. Further, the number of the air discharge ports 64a is not required to be matched with that of the flange division piece portions 23a. The workpiece passage confirming sensor 70 may be of a transmission type or a reflection type. Description is given of the case in which the first fixed point P1 and the second fixed point P2 are displaced by 45° along the circumferential direction, but the displacement angle is not limited to 45°.

INDUSTRIAL APPLICABILITY

The machine tool system can be used for grinding of a raceway surface of a hub wheel of a wheel bearing device as a workpiece The hub wheel comprises a solid shaft portion and a wheel mounting flange extending from the shaft portion in a radially outward direction, and the raceway surface is formed on the shaft portion in the vicinity of the flange.

REFERENCE SIGNS LIST 23 flange
23a flange division piece portion
23b cutout portion
30 loading mechanism
31 conveyor
32 detector
33 seating part
34 adjustor
35 calculator
36 rotary shaft
41 arm
42 chuck mechanism for conveyance
50 chuck mechanism for machining
53 seating surface
60 seating confirming part
61 air supply mechanism
62 air pressure detector
64 air supply passage
64a air discharge port
70 workpiece passage confirming sensor

The invention claimed is:

1. A loading mechanism comprising:
a conveyor configured to convey a workpiece from a first fixed point to a second fixed point in a chucked state;
a detector configured to detect a phase of the workpiece that is being conveyed by the conveyor;
a seating part configured to receive the workpiece, which is conveyed to the second fixed point by the conveyor, to be seated thereon; and
an adjustor configured to adjust a workpiece seating phase of the seating part to the phase of the workpiece detected by the detector during conveyance of the workpiece from the first fixed point to the second fixed point by the conveyor,
wherein the detector comprises:
a workpiece passage confirming sensor including a pattern reading sensor configured to read an ON-OFF pattern, the workpiece passage confirming sensor being turned on in a workpiece detection state in which the workpiece is detected and being turned off in a workpiece non-detection state in which the workpiece is not detected; and
a calculator configured to calculate the phase of the workpiece based on the ON-OFF pattern read by the workpiece passage confirming sensor.

2. The loading mechanism according to claim 1, wherein the workpiece comprises a flange having cutout portions formed at a predetermined pitch along a circumferential direction, and
wherein the workpiece passage confirming sensor is configured to detect passage of a flange division piece portion between the cutout portions of the flange.

3. The loading mechanism according to claim 2, wherein the conveyor comprises:
an arm that is turned about a rotary shaft; and
a chuck mechanism for conveyance, which is arranged at a distal end of the arm, and is configured to chuck the workpiece.

4. A machine tool system comprising the loading mechanism of claim 2,
wherein the seating part comprises:
a chuck mechanism for machining configured to chuck and support the workpiece conveyed to the second fixed point by the conveyor; and
a seating confirming part configured to define a chuck support state by the chuck mechanism for machining as a state in which the workpiece is seated and confirm whether or not the workpiece is appropriately seated.

5. The machine tool system according to claim 4, wherein the seating confirming part comprises:
an air supply mechanism including an air supply passage for discharging air from an air discharge port to the workpiece; and
an air pressure detection sensor configured to detect an air pressure in the air supply passage of the air supply mechanism.

6. The loading mechanism according to claim 1, wherein the conveyor comprises:
an arm that is turned about a rotary shaft; and
a chuck mechanism for conveyance, which is arranged at a distal end of the arm, and is configured to chuck the workpiece.

7. A machine tool system comprising the loading mechanism of claim 6,
wherein the seating part comprises:
a chuck mechanism for machining configured to chuck and support the workpiece conveyed to the second fixed point by the conveyor; and
a seating confirming part configured to define a chuck support state by the chuck mechanism for machining as a state in which the workpiece is seated and confirm whether or not the workpiece is appropriately seated.

8. A machine tool system comprising the loading mechanism of claim 1,
wherein the seating part comprises:
a chuck mechanism for machining configured to chuck and support the workpiece conveyed to the second fixed point by the conveyor; and
a seating confirming part configured to define a chuck support state by the chuck mechanism for machining as a state in which the workpiece is seated and confirm whether or not the workpiece is appropriately seated.

9. The machine tool system according to claim 8, wherein the seating confirming part comprises:
an air supply mechanism including an air supply passage for discharging air from an air discharge port to the workpiece; and
an air pressure detection sensor configured to detect an air pressure in the air supply passage of the air supply mechanism.

10. The loading mechanism comprising:
a conveyor configured to convey a workpiece from a first fixed point to a second fixed point in a chucked state;
a detector configured to detect a phase of the workpiece that is being conveyed by the conveyor;
a seating part configured to receive the workpiece, which is conveyed to the second fixed point by the conveyor, to be seated thereon; and
an adjustor configured to adjust a workpiece seating phase of the seating part to the phase of the workpiece detected by the detector during conveyance of the workpiece from the first fixed point to the second fixed point by the conveyor,
wherein the detector comprises a workpiece passage confirming sensor,
wherein the workpiece comprises a flange having cutout portions formed at a predetermined pitch along a circumferential direction, and wherein the workpiece passage confirming sensor is configured to detect passage of a flange division piece portion between the cutout portions of the flange.

11. The loading mechanism according to claim 10, wherein the conveyor comprises:
   an arm that is turned about a rotary shaft; and
   a chuck mechanism for conveyance, which is arranged at a distal end of the arm, and is configured to chuck the workpiece.

12. A machine tool system comprising the loading mechanism of claim 11,
   wherein the seating part comprises:
      a chuck mechanism for machining configured to chuck and support the workpiece conveyed to the second fixed point by the conveyor; and
      a seating confirming part configured to define a chuck support state by the chuck mechanism for machining as a state in which the workpiece is seated and confirm whether or not the workpiece is appropriately seated.

13. A machine tool system comprising the loading mechanism of claim 10,
   wherein the seating part comprises:
      a chuck mechanism for machining configured to chuck and support the workpiece conveyed to the second fixed point by the conveyor; and
      a seating confirming part configured to define a chuck support state by the chuck mechanism for machining as a state in which the workpiece is seated and confirm whether or not the workpiece is appropriately seated.

14. The machine tool system according to claim 13, wherein the seating confirming part comprises:
   an air supply mechanism including an air supply passage for discharging air from an air discharge port to the workpiece; and
   an air pressure detection sensor configured to detect an air pressure in the air supply passage of the air supply mechanism.

15. A machine tool system comprising a loading mechanism comprising:
   a conveyor configured to convey a workpiece from a first fixed point to a second fixed point in a chucked state;
   a detector configured to detect a phase of the workpiece that is being conveyed by the conveyor;
   a seating part configured to receive the workpiece, which is conveyed to the second fixed point by the conveyor, to be seated thereon; and
   an adjustor configured to adjust a workpiece seating phase of the seating part to the phase of the workpiece detected by the detector during conveyance of the workpiece from the first fixed point to the second fixed point by the conveyor,
   wherein the seating part comprises:
      a chuck mechanism for machining configured to chuck and support the workpiece conveyed to the second fixed point by the conveyor; and
      a seating confirming part configured to define a chuck support state by the chuck mechanism for machining as a state in which the workpiece is seated and confirm whether or not the workpiece is appropriately seated.

16. The machine tool system according to claim 15, wherein the seating confirming part comprises:
   an air supply mechanism including an air supply passage for discharging air from an air discharge port to the workpiece; and
   an air pressure detection sensor configured to detect an air pressure in the air supply passage of the air supply mechanism.

17. A machine tool system comprising a loading mechanism comprising:
   a conveyor configured to convey a workpiece from a first fixed point to a second fixed point in a chucked state;
   a detector configured to detect a phase of the workpiece that is being conveyed by the conveyor;
   a seating part configured to receive the workpiece, which is conveyed to the second fixed point by the conveyor, to be seated thereon; and
   an adjustor configured to adjust a workpiece seating phase of the seating part to the phase of the workpiece detected by the detector during conveyance of the workpiece from the first fixed point to the second fixed point by the conveyor,
   wherein the conveyor comprises:
      an arm that is turned about a rotary shaft; and
      a chuck mechanism for conveyance, which is arranged at a distal end of the arm, and is configured to chuck the workpiece, and
   wherein the seating part comprises:
      a chuck mechanism for machining configured to chuck and support the workpiece conveyed to the second fixed point by the conveyor; and
      a seating confirming part configured to define a chuck support state by the chuck mechanism for machining as a state in which the workpiece is seated and confirm whether or not the workpiece is appropriately seated.

18. The machine tool system according to claim 17, wherein the seating confirming part comprises:
   an air supply mechanism including an air supply passage for discharging air from an air discharge port to the workpiece; and
   an air pressure detection sensor configured to detect an air pressure in the air supply passage of the air supply mechanism.

* * * * *